US005542522A

United States Patent [19]

Adrian et al.

[11] Patent Number: 5,542,522

[45] Date of Patent: Aug. 6, 1996

[54] BALUSTRADE ASSEMBLY AND METHOD FOR ASSEMBLING A BALUSTRADE ASSEMBLY

[75] Inventors: Willy Adrian, Obernkirchen; Frank Bäthge, Hanover; Peter Borchers, Alfeld; Kurt Pietsch, Minden; Knuth Wallbaum, Wunstrof; Gerald Wente, Pohle, all of Germany

[73] Assignee: Otis Elevator Company, Farmington, Conn.

[21] Appl. No.: 52,880

[22] Filed: Apr. 26, 1993

[51] Int. Cl.$^6$ .................................................. B65G 15/00

[52] U.S. Cl. .................................................. 198/337

[58] Field of Search .................................. 198/335, 337; 52/208, 766, 767

[56] References Cited

U.S. PATENT DOCUMENTS 4,690,264 9/1987 Adrian et al. .......................... 198/335

4,819,781 4/1989 Saito et al. .............................. 198/335

5,156,251 10/1992 Johnson ................................. 198/335

*Primary Examiner*—Joseph E. Valenza

[57] ABSTRACT

A balustrade assembly is provided having a shaped panel holder for supporting a balustrade panel, an outer decking and an inner profile. The inner profile, outer decking and panel holder include a clip apparatus which enable the outer decking and inner profile to be attached to the panel holder in a constant aligned position, independent of the balustrade panel. A method for assembling a balustrade assembly is also provided including the steps of providing a balustrade panel for supporting a handrail, a shaped panel holder, an inner profile, an outer decking, and apparatus for clipping the panel holder, the inner profile, and the outer decking together. The steps further include attaching the outer decking to the panel holder with the clip apparatus, independent of the balustrade panel, attaching the balustrade panel to the panel holder, and attaching the inner profile to the panel holder with the clip apparatus, independent of the balustrade panel and in a constant aligned position with the outer decking and the panel holder.

20 Claims, 4 Drawing Sheets

BALUSTRADE ASSEMBLY AND METHOD FOR ASSEMBLING A BALUSTRADE ASSEMBLY

TECHNICAL FIELD

This invention relates to people moving devices in general, and balustrades in particular.

BACKGROUND ART

Escalators, moving walkways, and other people moving devices efficiently move a large volume of pedestrian traffic from one point to another. Passengers step on moving steps (or belts, or pallets) and are transported along at a constant rate of speed. For safety reasons, passenger handrails are provided, traveling in the same direction and speed as the steps. A balustrade assembly supports and guides one of the handrails on each side of the steps.

Each balustrade assembly includes balustrade panels (typically glass) which extend up from a base to support the handrail. Externally, the base consists of a number of enclosure panels including an outer decking, an outer cladding, an inner profile, and a skirt panel. The outer decking and outer cladding enclose the mechanics on the side of the balustrade panel opposite the moving steps. The inner profile and skirt panel enclose the mechanics adjacent the moving steps.

Within the base, there are a number of ways known to support the balustrade and enclosure panels. Typically, the balustrade panel is supported by a panel holder fixed to a bracket welded to the frame of the escalator. The enclosure panels are supported by brackets fixed to the frame or by brackets fixed to the panel holder. Alternatively, the enclosure panels may be directly attached to the panel holders.

It is known in the art that a desirable balustrade design must provide a rigid structure which supports the balustrade panel and prevents the public from accessing the balustrade mechanics and moving handrail within. However, a desirable balustrade must also allow access to the enclosed mechanics, must be easily manufactured and assembled, and must be as inexpensive as possible. These requirements, however, are often at odds with one another. For example, a balustrade design which rigidly supports the balustrade panel and provides a strong, impenetrable enclosure is often expensive and difficult to assemble. On the other hand, if lighter, less expensive materials are used which rely on geometry to provide rigidity, these structures often make access within the balustrade difficult. What is needed is a balustrade which provides a rigid support for the handrail and which is easily manufactured and assembled, while allowing ease of maintenance at a reasonable cost.

DISCLOSURE OF THE INVENTION

It is an object, therefore, of the present invention to provide a balustrade can be assembled with a minimum of adjustment.

It is a further object of the present invention to provide a balustrade which rigidly supports the handrail.

It is still a further object of the present invention to provide an easily maintained balustrade.

It is a still further object of the present invention to provide a balustrade as inexpensive as possible.

It is a still further object of the present invention to a method for assembling a balustrade assembly.

According to the present invention, a balustrade assembly is provided having a shaped panel holder for supporting a balustrade panel, an outer decking and an inner profile. The inner profile, outer decking and panel holder include a clip means which enables the outer decking and inner profile to be attached to the panel holder in a constant aligned position, independent of the balustrade panel.

According to one aspect of the present invention, the clip means comprises outer and inner supports to support and maintain the position of the outer decking and inner profile relative to the panel holder and one another.

According to another aspect of the present invention, the panel holder includes a plurality of attachment means.

According to still another aspect of the present invention, the outer support includes a retaining means and a snap clip which prevent the outer decking from being disconnected from the outer support unless the snap clip is disconnected before the retaining means is released.

According to still another aspect of the present invention, the outer decking is extruded, having a plurality of ribs in communication with the outer support.

According to still another aspect of the present invention, a panel holder bracket is provided capable of adjustment in two axes of direction, having a means for adjusting and locating a handrail guide.

According to still another aspect of the present invention, a wedge shaped clamp is provided to secure the balustrade panel in the panel holder, having an extended length.

According to still another aspect of the present invention, a method for assembling a balustrade assembly is provided which allows the outer decking and inner profile to be attached to the panel holder in a constant aligned position, independent of the balustrade panel.

The clip means comprised within the inner profile, outer decking, and panel holder, provides several advantages. First, supporting and positioning the inner profile and outer decking off of the panel holder causes the position of the inner profile and the outer decking to be fixed with respect to the panel holder and to each other. Consequently, no alignment thereof is required.

Second, the clip means enables the outer decking to be positioned and attached to the panel holder with the balustrade panel out, thereby eliminating the need to reach over the balustrade to the outer decking or alternatively the need to build scaffolding to reach the outer decking. As a result, installation and maintenance time is minimized and a potential hazard is avoided.

Third, the clip means includes inner and outer supports any number of which may be attached at any position along the panel holder, thereby allowing the rigidity of the assembly to be increased as necessary.

Fourth, the width of the inner and outer supports is great enough to provide a transition surface underneath adjacent sections of inner profile and outer decking, thereby facilitating the alignment of adjacent sections.

Fifth, the retaining means and snap clip of the outer support prevent unauthorized people from pulling up the outer edge of the outer decking unless the snap clip is disconnected before the retaining means is released.

Sixth, the retaining means and snap clip of the outer support allow the outer decking to be mounted in close proximity to other services such as adjacent escalators or walls.

Another advantage of the present invention is the extended length of the wedge shaped clamp. The extended length of the clamp decreases the length of the moment arm of any force applied to the balustrade panel and distributes the clamping force of the wedge over a greater area.

These and other objects, features and advantages of the present invention will become more apparent in light of the detailed description of the best mode embodiment, thereof, as illustrated in the accompanying drawings.

DETAILED DESCRIPTION OF THE DRAWINGS

BEST MODE FOR CARRYING OUT THE INVENTION

Figure 1:
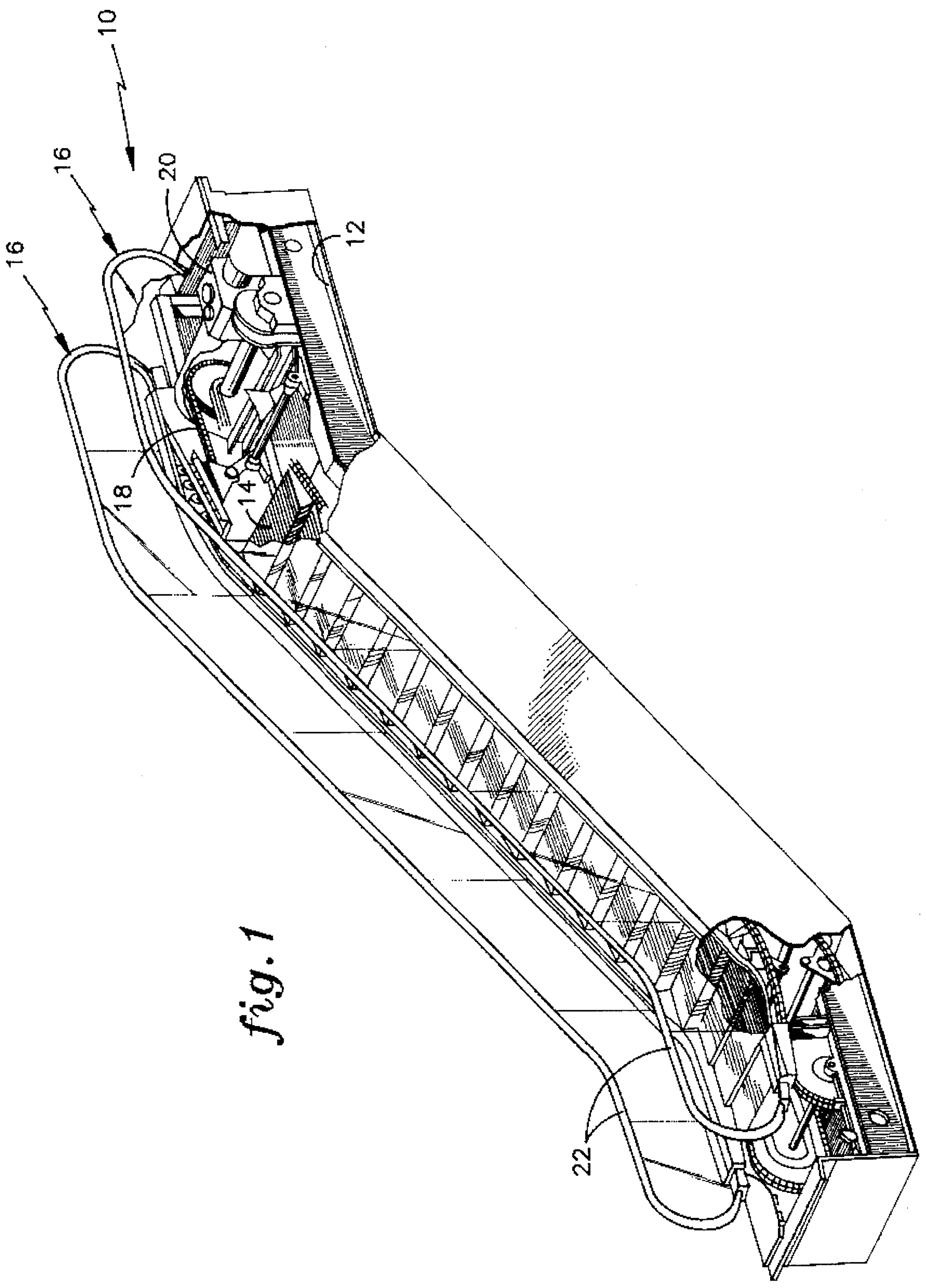
FIG. 1 is a perspective view of an entire escalator, having cut-aways to show internal structure.

Referring to FIG. 1, an escalator 10 is shown having a frame 12, a plurality of moving steps 14, and a pair of balustrade assemblies 16. The steps 14 are connected to a step chain 18 which is driven around a circuitous path by an electric drive motor 20. On each side of the steps 14, a handrail 22 is driven in the same direction and speed as the steps 14, as is known in the art. The handrails 22 enable passenger(s) (not shown) to steady themselves while riding the escalator 10.

Figure 2:
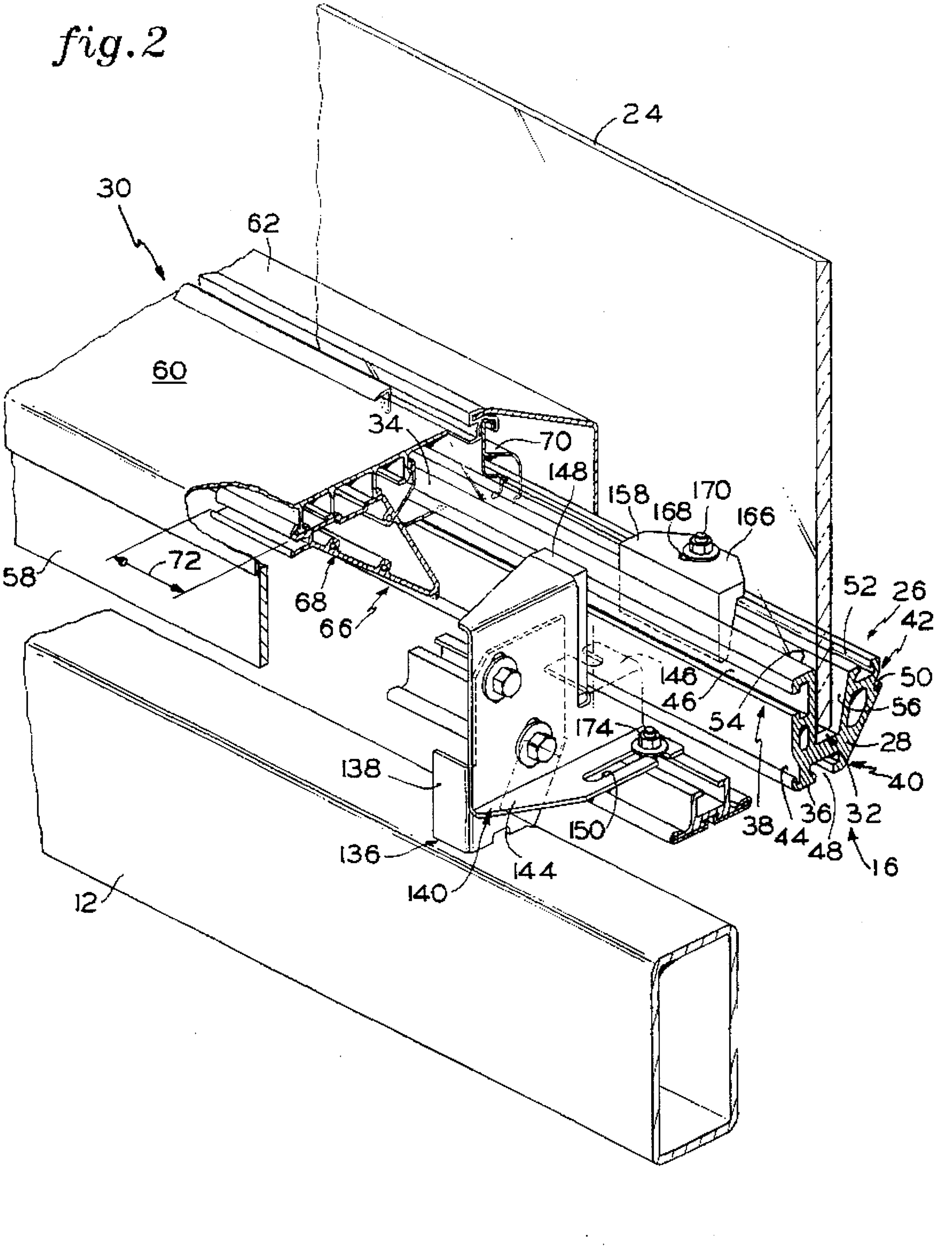
FIG. 2 is a perspective view of the balustrade.
Figure 3:
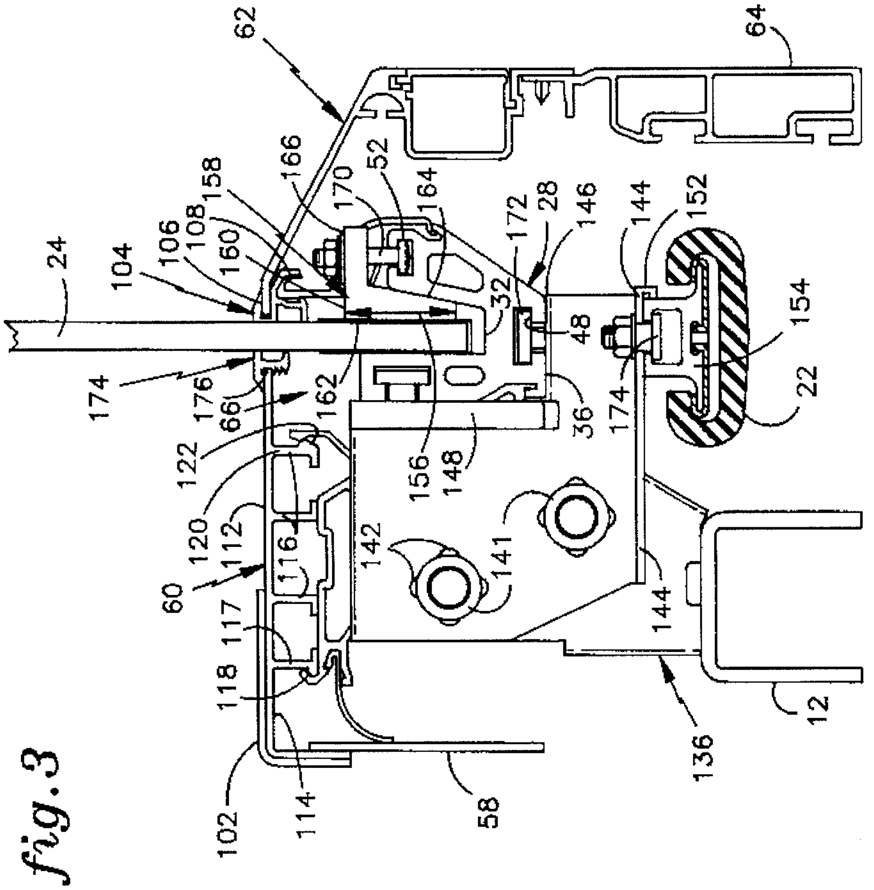
FIG. 3 is a diagrammatic front view of the balustrade.
Figures 5A, 5B, 5C, 5D, 5E, 5F, 5G, 5H, 5I:
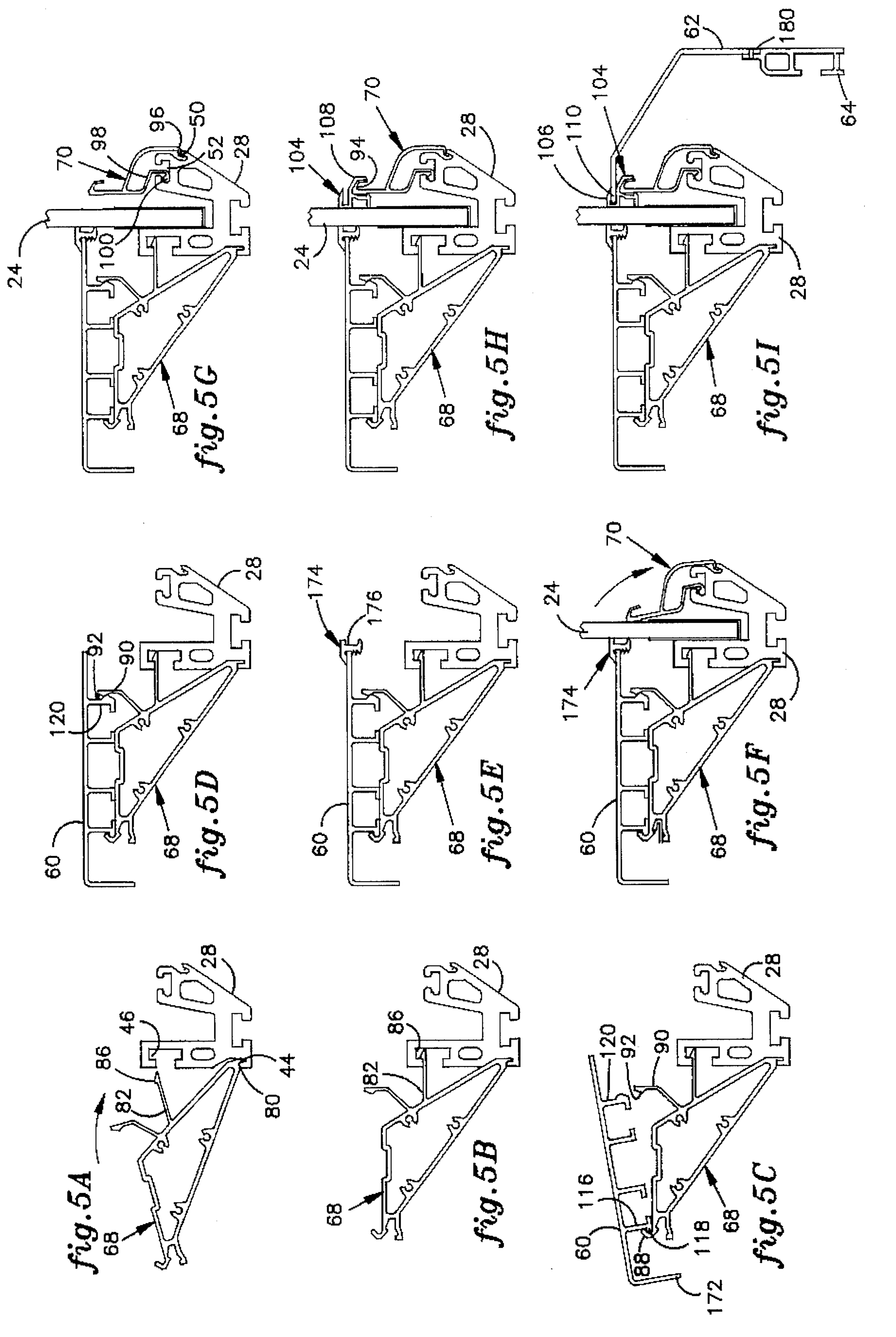
FIGS. 5A–5I are diagrammatic views illustrating the arrangement between the balustrade elements.

Now referring to FIGS. 2 and 3, each balustrade assembly 16 includes a balustrade panel 24 extending up from a base 26 to support and guide a handrail (not shown). The base 26 includes a panel holder 28 for supporting the balustrade panel 24 (typically glass) and a plurality of enclosure panels 30.

The panel holder 28 has an extruded or otherwise shaped cross-sectional profile consisting of a glass channel 32, a top surface 34, a bottom surface 36, and a first 38, second 40, and third 42 attachment means, all of which extend the length of the panel holder 28. The first attachment means 38, positioned on the side of the panel holder 28 away from the moving steps (not shown), comprises a first tab slot 44 and a first C-shaped channel 46. The second attachment means 40, positioned within the bottom surface 36, comprises a second C-shaped channel 48. The third attachment means 42, positioned on the side of the panel holder 28 adjacent the moving steps (not shown), comprises a second tab slot 50 and a third C-shaped channel 52. The glass channel 32 comprises a first wall 54 parallel to the balustrade panel 24 and a second wall 56 disposed at an angle to the first wall 54, thereby forming an acute angle between the two walls.

Referring to FIGS. 2 and 3, an adjustable panel holder bracket 136 is provided for supporting the panel holder 28. Each adjustable bracket 136 includes a first half 138 attached to the frame 12 of the escalator and a second half 140 attached to the panel holder 28. Each half 138,140 includes two pairs of elliptical shaped slots 142 oriented at right angles to one another in two axes of direction. Fasteners 141 extend through the slots 142 of each half, thereby connecting the halves 138,140 and permitting the position of each half to be adjusted relative to the other. A person of ordinary skill will recognize that slots 142 may assume geometric shapes other than ellipses. The second half 140 comprises a first flange 144, a second flange 146, and a third flange 148, all of which include an open slot for receiving a fastener. The slot 150 in the first flange 144 includes a stop 152 at one end for locating a handrail guide 154. The third flange 148 is a plate welded to the body of the second half 140 to add rigidity to the glass support bracket 136.

Referring to FIG. 3, a wedge shaped clamp 158 is provided to secure the balustrade panel 24 in the glass channel 32 of the panel holder 28. The wedge clamp 158 includes a top surface 160 and a panel-side surface 162, perpendicular to one another, and an angled surface 164 extending therebetween. The top surface 160 extends beyond the intersection with the angled surface 164 to form an ear 166. An open slot 168 in the ear 166 is positioned to receive a fastener 170. The extended length 156 of the wedge 158 is measured along the panel side surface 162 of the wedge, from the top surface 160 down to the intersection of the panel-side 162 and angled surfaces 164.

The enclosure panels 30 include an outer cladding 58, an outer decking 60, an inner profile 62, and a skirt panel 64. The inner profile 62, outer decking 60, and panel holder 28 comprise a clip means 66 which enables the inner profile 62 and outer decking 60 to be attached to the panel holder 28 in a constant aligned position, independent of the balustrade panel 24. As a result, the inner profile 62 and the outer decking 60 are constantly aligned relative to the panel holder 28 and to each other.

Figure 4A:
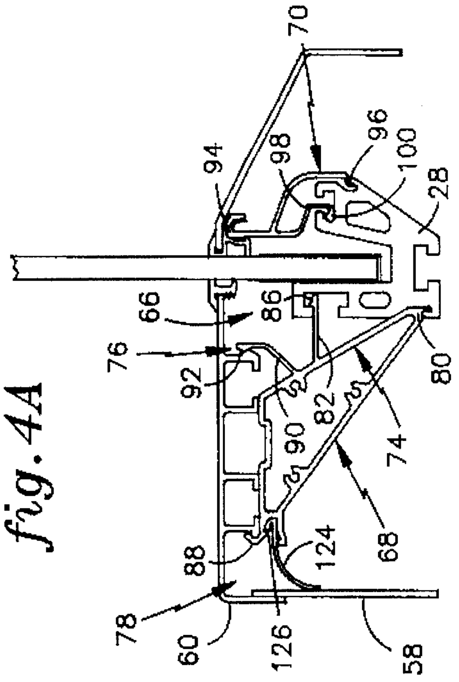
FIG. 4A is a cross-sectional view of the balustrade showing an outer cladding support.

Referring to FIGS. 2 and 4A, the clip means 66 includes an outer support 68 and an inner support 70, shown in cross-section in FIG. 4A. The outer support 68 has a width 72 (see FIG. 2—perspective view), an attachment clip 74, a snap clip 76, and a retaining means 78. The attachment clip 74 consists of a first tab 80 and a first biasing arm 82 having a boss 86. The retaining means 78 comprises a female receptacle in the form of a semicircular flange 88. The snap clip 76 comprises a second biasing arm 90 having a boss 92. The inner support 70 includes a hook shaped flange 94, a second tab 96, and a third biasing arm 98 having a boss 100.

Referring to FIG. 3, the outer decking 60 is an extrusion having a cross-sectional profile defined by an exterior surface 112, an interior surface 114, and a plurality of ribs 116 extending out from the interior surface 114. A first rib 117 includes a male semicircular boss 118. A second rib 120 includes a second boss 122.

Each balustrade assembly 16 further includes an inner trim molding 104 and an outer trim molding 174. The inner trim molding 104 includes a narrow channel 106 and a broad channel 108. The outer trim molding 174 includes a channel 176.

The enclosure panels 30 and the panel holder 28 may be fabricated from a number of different materials, including metal, plastics, or composites. In some embodiments, independent exterior panels 102 are attached to the enclosure panels 30 for aesthetic or wear purposes.

Figure 4B:
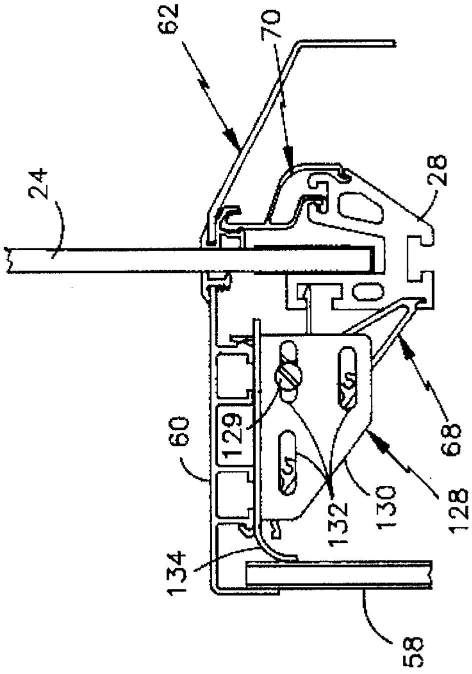
FIG. 4B is a cross-sectional view of the balustrade showing an adjustable outer cladding support.

Referring to FIGS. 4A and 4B, depending on the application of the escalator and/or the aesthetic decor of the location, the outer cladding 58 may be fabricated from materials different from the rest of the balustrade. If the cladding 58 is fabricated from material formed in sheets, such as sheet metal or sheet plastic, a spring-type cladding support 124 (FIG. 4A) biases the cladding 58 against the outer decking 60. The spring-type cladding support 124 comprises a clip means 126 which attaches the cladding support 124 to the outer support 68. If the cladding 58 is thicker, or varies in thickness, an adjustable cladding support 128 (FIG. 4B) biases the cladding 58 against the outer decking 60. The adjustable cladding support 128 comprises a plate 130 having a plurality of parallel slots 132 and a biasing arm 134. Screws 129 extend through the slots 132. The screws 129 attach and permit the adjustable cladding support 128 to be adjusted as necessary depending upon the cladding 58 thickness.

In the assembly of the escalator balustrade, the panel holder 28 on each side of the escalator is positioned off of a chosen reference point. The panel holders 28 then become the foundation from which the balustrade 16 is assembled. Typically, three or four sections of extruded panel holder 28 are used per side, although a single continuous piece may alternatively be used. Either way, each panel holder section 28 is installed by attaching an adjustable bracket 136 to each end of the section 28. The second half 140 of the bracket 136 is attached to the panel holder 28 by a T-shaped fastener 172 received within the second C-shaped channel 48 in the bottom surface 36 of the panel holder 28. The first half 138 of the bracket 136 is welded to the frame 12. When the panel holder 28 is properly aligned, the bracket halves 138,140 are securely bolted or otherwise fastened together. Subsequently, brackets are added along the length of each section as needed. In addition to the bolts, or in place of them, the bracket halves 138,140 may be fixed to one another by a clinching method (not shown). The clinching method uses a cylindrical stamp which makes a concentric depression in the two pieces to be joined. The deformed metal of one piece flares within the deformed metal of the other, thereby joining the two. The trademark "TOX", registered to Pressotechnik Gmbh, is used to describe this method.

Referring to FIGS. 2 and 3, after all the brackets 136 have been attached and the panel holder 28 secured, the handrail guide 154 for the handrail 22 traveling within the balustrade can be attached to the first flange 144 of the adjustable panel holder bracket 136. A T-shaped fastener 174, received within the slot 150 in the first flange 144, is used to attach the guide 154 to the bracket 136. The slot 150 is long enough to permit the handrail guide 154 to be slid laterally, thereby allowing greater access within the base 26 of the balustrade 16. When the installation or maintenance work is completed, the handrail guide 154 is located in its proper position by sliding the guide 154 back through the slot 150 until it abuts the physical stop 152 extending out from the first flange 144 of the bracket 136.

Now referring to FIGS. 5A–5F, the method of assembling the base enclosure begins by first attaching the outer support 68. To attach the outer support 68, the first tab 80 is inserted in the first tab slot 44 of the panel holder 28, and the outer support 68 is rotated clockwise until the first biasing arm 82 is biased within the first C-shaped channel 46 of the first attachment means. The boss 86 on the end of the first biasing arm 82 holds the outer support 68 and the panel holder 28 together.

Next, the outer decking 60 is attached and positioned relative to the panel holder 28 by inserting the semi-circular boss 118 on the end of the first rib 116 into the semicircular flange 88 formed in the outer support 68. A person of ordinary skill in the art will recognize that the mating male and female relationship between the male extension 118 and the female receptacle 88 may assume a number of different geometries. The function of the mating male and female pieces is to prevent the outer edge 172 of the outer decking 60 from being pulled away from the outer support 68 after installation. Once the first rib 116 and semi-circular flange 88 are joined, the outer decking 60 can be rotated clockwise until the second biasing arm 90 is biased against the second rib 120 of the outer decking 60. The boss 92 attached to the end of the second biasing arm 90 holds the outer decking 60 and the outer support 68 together.

After the outer decking 60 is secured to the panel holder 28 by the outer support 68, the outer trim molding 174 is fit over the edge of the outer decking 60, inside channel 176. When the balustrade panel 24 is installed, the outer trim molding 174 is adjusted to close the gap between the edge of the outer decking 60 and the balustrade panel 24.

To remove the outer decking 60 after the balustrade is assembled, the outer trim 174 is removed and a tool (not shown) is inserted between the outer decking 60 and the balustrade panel 24. The outer decking 60 is pulled up and pivoted away from the balustrade panel 24. Subsequently moving the outer decking toward the balustrade panel, causes the outer decking 60 and the outer support 68 to decouple and allows the outer decking 60 to be removed.

Referring to FIGS. 2 and 3, the balustrade panels 24 are installed by placing a single panel 24 in the glass channel(s) 32 and loosely placing the wedge shaped clamps 158 in the channel 32. Once the panel has been aligned, the wedge clamps 158, and therefore the panels, are secured using the T-shaped fasteners 170 received within the third C-shaped channel 52. Note that the extended length 156 of the wedge clamps 158 causes their top surface 160 to always be above the top surface 34 of the panel holder 28. As a result, the moment arm of any horizontal force (not shown) applied to the balustrade panel 24 is minimized and the clamping load is distributed over a greater area. Additional balustrade panels 24 are aligned off of the first panel and secured in the same manner.

Referring to FIGS. 5F–5I, after the balustrade panel 24 is installed, the inner support 70 is mounted on the panel holder 28 by inserting the third biasing arm 98 into the third C-shaped channel 52 and rotating the inner support 70 clockwise until the second tab 96 may be inserted into the second tab slot 50. The boss 100 on the end of the third biasing arm 98 holds the inner support 70 and the panel holder 28 together. Subsequently, the inner trim molding 104 is attached by inserting the hook-shaped flange 94 into the broad channel 108 of the molding 104.

The inner profile 62 is attached to the panel holder by inserting the upper edge 110 of the profile 62 into the narrow channel 106 of the inner trim molding 104, attached to the inner support. The lower edge 180 of the inner profile 62 is attached to the skirt panel 64. A person of ordinary skill in the art will recognize that the inner support 70 could include a slot (not shown) for receiving the upper edge of the profile 62, in place of the inner trim molding 104.

A person of ordinary skill in the art will also recognize that the mating T-shaped fastener and C-shaped channel combinations used to attach the panel holder 28 to the panel holder bracket 136, the wedge clamp 158 to the panel holder 28, and the handrail guide 154 to the panel holder bracket 136, may assume a number of different mating geometries.

A person of ordinary skill in the art will recognize further that although this invention has been described in terms of an escalator, the invention equally applies to other people moving devices such as moving walkways, and other people moving devices.

Although this invention has been shown and described with respect to the detailed embodiments thereof, it will be understood by those skilled in the art that various changes in form and detail thereof may be made without departing from the spirit and scope of the claimed invention.

We claim:

1. A balustrade assembly having a balustrade panel for supporting a handrail, comprising:

a shaped panel holder, having a cross-sectional profile that extends in a lengthwise direction;

an inner profile;

an outer decking; and means for clipping said inner profile and said outer decking to said panel holder;

wherein said means for clipping attaches said inner profile and said outer decking to said panel holder in a constant aligned position, relative to said panel holder and to each other, independent of the balustrade panel, at any position along said length of said panel holder, thereby eliminating the need to adjust the position of said inner profile and said outer decking.

2. A balustrade assembly according to claim 1, wherein said panel holder is shaped by an extrusion process.

3. A balustrade assembly according to claim 1, wherein said means for clipping comprises:

an inner support, having a width, for supporting and maintaining the position of said inner profile relative to said panel holder, said inner support having a trim clip and an attachment clip, wherein said attachment clip attaches said inner support to said panel holder, and said trim clip holds an inner trim molding in between said inner profile and the balustrade panel; and an outer support, having a width, for supporting and maintaining the position of said outer decking relative to said panel holder, said outer support comprising a retaining means, a snap clip, and an attachment clip, wherein said attachment clip attaches said outer support to said panel holder, and said retaining means and said snap clip attach said outer decking to said outer support, said retaining means locating said outer decking and preventing said outer decking from being disconnected from said outer support until said snap clip is disconnected from said outer decking.

4. A balustrade assembly according to claim 3, wherein said outer decking comprises:

a shaped profile, having an exterior surface and an interior surface, and a plurality of ribs extending out from said interior surface; and wherein one of said ribs forms a mating male and female pair with said retaining means of said outer support, and said snap clip of said outer support is biased against another of said ribs.

5. A balustrade assembly according to claim 4, wherein said outer decking further comprises an exterior panel attached to said exterior surface of said outer decking.

6. A balustrade assembly according to claim 3, further comprising:

an outer cladding, in register with said outer decking for enclosing said balustrade assembly; and a cladding support, having a clip means for attaching said cladding support to said outer support, wherein said cladding support biases said outer cladding against said outer decking.

7. A balustrade assembly according to claim 3, further comprising:

an outer cladding, in register with said outer decking for enclosing said balustrade assembly; and an adjustable cladding support, attached to said outer support, wherein said adjustable cladding support adjustably biases said outer cladding against said outer decking.

8. A balustrade assembly according to claim 3, further comprising:

an adjustable panel holder bracket, for supporting said panel holder, wherein said bracket may be adjusted to allow said panel holder to be moved in two axis of direction;

means for attaching said panel holder to said adjustable panel holder bracket;

means for attaching a handrail guide;

means for adjusting the position of said handrail guide; and means for locating said handrail guide, wherein said locating means provides a fixed positional reference point from which said handrail guide may be positioned.

9. A balustrade assembly according to claim 1, further comprising:

a plurality of attachment means, comprised within said panel holder, extending said length of said panel holder;

a wedge shaped clamp, having a top surface, a panel side surface, and an angled surface extending between said top and panel side surfaces, and an extended length, said length defined as the distance along said panel side surface between said top surface and the intersection of said panel side and said angled surfaces, for clamping the balustrade panel in said panel holder; and a wedge attachment means, for attaching said wedge shaped clamp to said panel holder, wherein said wedge attachment means and said attachment means of said panel holder form a mating male and female pair that enables said wedge to be securely fastened to said panel holder at positions along said length of said panel holder.

10. A balustrade assembly according to claim 9, wherein said panel holder comprises a channel for receiving the balustrade panel, having a side parallel to the balustrade panel and a side at an angle to the balustrade panel, said parallel side having an edge which defines an upper surface of said panel holder, wherein said wedge shaped clamp fits between the balustrade panel and said angled side of said slot, and wherein said top surface of said wedge is always above said upper surface of said panel holder.

11. A method for assembling a balustrade assembly, comprising the steps of providing a balustrade panel for supporting a handrail;

providing a shaped panel holder, having a cross-sectional profile that extends in a lengthwise direction;

providing an inner profile and an outer decking;

providing means for clipping said inner profile and said outer decking to said panel holder;

attaching said outer decking to said panel holder with said means for clipping, thereby supporting and maintaining the position of said outer decking relative to said panel holder;

attaching said balustrade panel to said panel holder;

attaching said inner profile to said panel holder with said means for clipping, thereby supporting and maintaining the position of said inner profile relative to said panel holder; and wherein said inner profile and said outer decking are attached to said panel holder by said means for clipping, in a constant aligned position, relative to said panel holder and to each other, independent of said balustrade panel, at any position along said length of said panel holder, thereby eliminating the need to adjust the position of said inner profile and said outer decking.

12. A method for assembling a balustrade assembly according to claim 11, wherein said clip means comprises an outer support for attaching said outer decking to said panel holder, and an inner support for attaching said inner profile to said panel holder.

13. A balustrade assembly having a balustrade panel for supporting a handrail, comprising:

a shaped panel holder, having a cross-sectional profile that extends in a lengthwise direction;

an inner profile;

an outer decking;

means for clipping said inner profile and said outer decking to said panel holder;

a wedge shaped claim, for damping the balustrade panel within said panel holder; and means for attaching said wedge clamp to said panel holder, wherein said means for attaching may attach said wedge damp at any point along said length of said panel holder;

wherein said means for clipping attaches said inner profile and said outer decking to said panel holder in a constant aligned position, relative to said panel holder and to each other, independent of the balustrade panel at any position along said length of said panel holder, thereby eliminating the need to adjust the position of said inner profile and said outer decking.

14. A balustrade assembly according to claim 13, wherein said panel holder is shaped by an extrusion process.

15. A balustrade assembly according to claim 13, wherein said means for clipping comprises:

an inner support, having a width, for supporting and maintaining the position of said inner profile relative to said panel holder, said inner support having a trim clip and an attachment clip, wherein said attachment clip attaches said inner support to said panel holder, and said trim clip holds an inner trim molding in between said inner profile and the balustrade panel; and an outer support, having a width, for supporting and maintaining the position of said outer decking relative to said panel holder, said outer support comprising a retaining means, a snap clip, and an attachment clip, wherein said attachment clip attaches said outer support to said panel holder, and said retaining means and said snap clip attach said outer decking to said outer support, said retaining means locating said outer decking and preventing said outer decking from being disconnected from said outer support until said snap clip is disconnected from said outer decking.

16. A balustrade assembly according to claim 15, wherein said outer decking comprises:

a shaped profile, having an exterior surface and an interior surface, and a plurality of ribs extending out from said interior surface; and wherein one of said ribs forms a mating male and female pair with said retaining means of said outer support, and said snap clip of said outer support is biased against another of said ribs.

17. A balustrade assembly according to claim 16, wherein said outer decking further comprises an exterior panel attached to said exterior surface of said outer decking.

18. A balustrade assembly according to claim 15, further comprising:

an outer cladding, in register with said outer decking for enclosing said balustrade assembly; and a cladding support, having a dip means for attaching said cladding support to said outer support, wherein said cladding support biases said outer cladding against said outer decking.

19. A balustrade assembly according to claim 15, further comprising:

an outer cladding, in register with said outer decking for enclosing said balustrade assembly; and an adjustable cladding support, attached to said outer support, wherein said adjustable cladding support adjustably biases said outer cladding against said outer decking.

20. A balustrade assembly according to claim 15, further comprising:

an adjustable panel holder bracket, for supporting said panel holder, wherein said bracket may be adjusted to allow said panel holder to be moved in two axis of direction;

means for attaching said panel holder to said adjustable panel holder bracket;

means for attaching a handrail guide;

means for adjusting the position of said handrail guide; and means for locating said handrail guide, wherein said locating means provides a fixed positional reference point from which said handrail guide may be positioned.

* * * * *